United States Patent [19]
Ryde et al.

[11] Patent Number: 5,012,653
[45] Date of Patent: May 7, 1991

[54] MULTICOMPARTMENT TEMPERATURE CONTROLLED ROAD VEHICLES

[75] Inventors: Michael J. Ryde; Peter J. Warwick, both of Southampton, Great Britain

[73] Assignee: Petter Refrigeration Limited, United Kingdom

[21] Appl. No.: 307,274

[22] Filed: Feb. 6, 1989

[30] Foreign Application Priority Data

Feb. 5, 1988 [GB] United Kingdom ............... 8802600

[51] Int. Cl.$^5$ .................... F25B 41/00; H02J 1/00
[52] U.S. Cl. .................... 62/203; 62/323.3; 62/447; 307/39
[58] Field of Search .................. 62/175, 323.3, 447, 62/429, 203, 126, 243, 229; 307/39; 236/51

[56] References Cited

U.S. PATENT DOCUMENTS

| | | | |
|---|---|---|---|
| 2,053,945 | 9/1936 | Cowin | 62/229 X |
| 2,270,524 | 1/1942 | Helwig | 62/447 X |
| 2,534,272 | 12/1950 | Kleist | 62/441 X |
| 2,766,439 | 10/1956 | Palm | 62/323.1 X |
| 2,809,812 | 10/1957 | Erickson et al. | 62/323.3 X |
| 3,183,683 | 5/1965 | Reiter et al. | 62/447 X |
| 3,599,006 | 8/1971 | Harris | 307/39 |
| 4,679,411 | 7/1987 | Pearse, Jr. | 62/428 X |

Primary Examiner—William E. Wayner
Attorney, Agent, or Firm—Remy J. Vanophem

[57] ABSTRACT

A multicompartmented road vehicle, e.g., a six-lane delivery truck 16, has a separate refrigerator system for each lane, governed by a separate thermostat in each case. The corresponding condensers are conveniently arranged in a bank or accumulation. A common generator, preferably supplied with a sequencing arrangement to prevent start-up overload, or casual overload, generates the electrical power to drive the refrigeration systems. The cost of initial installation is an acceptable proportion of the cost of a heavy truck, the cost of maintenance is less than for maintenance of complex valving, ducting and internal prioritizing logic systems as in interconnected refrigeration systems of the prior art, and the mass and size of the installation is again compatible with the truck size and shape. Thus the normally counterindicated provision of separate rather than shared systems has unexpected advantage. Also, the single on-board generator would be powerful enough to operate loading and unloading equipment when desired.

6 Claims, 3 Drawing Sheets

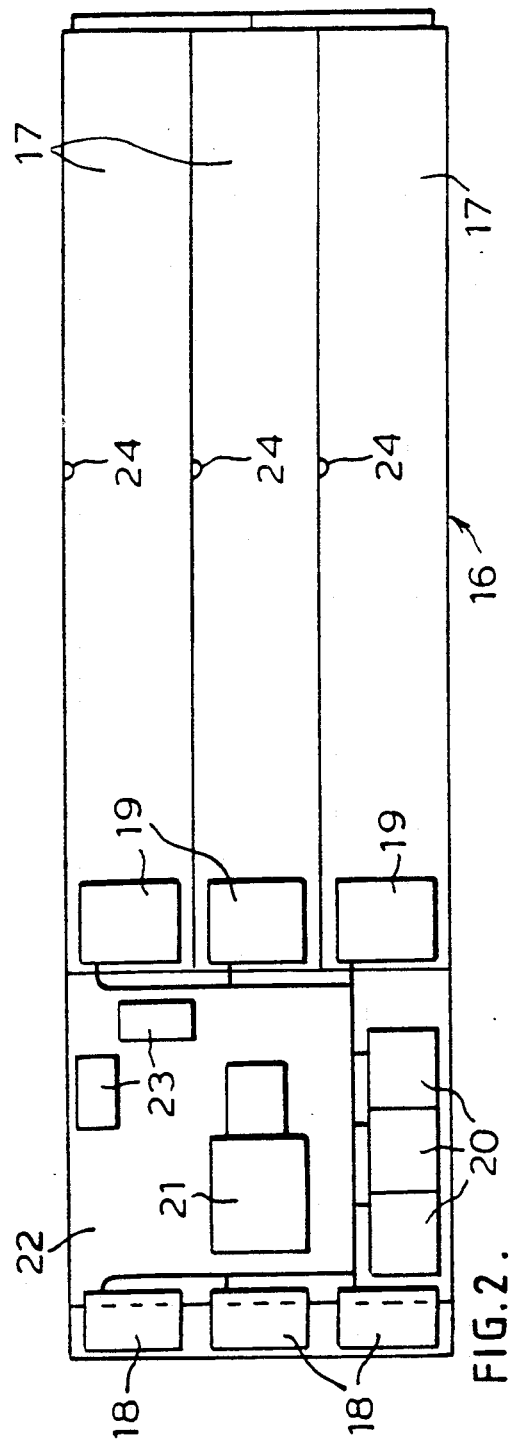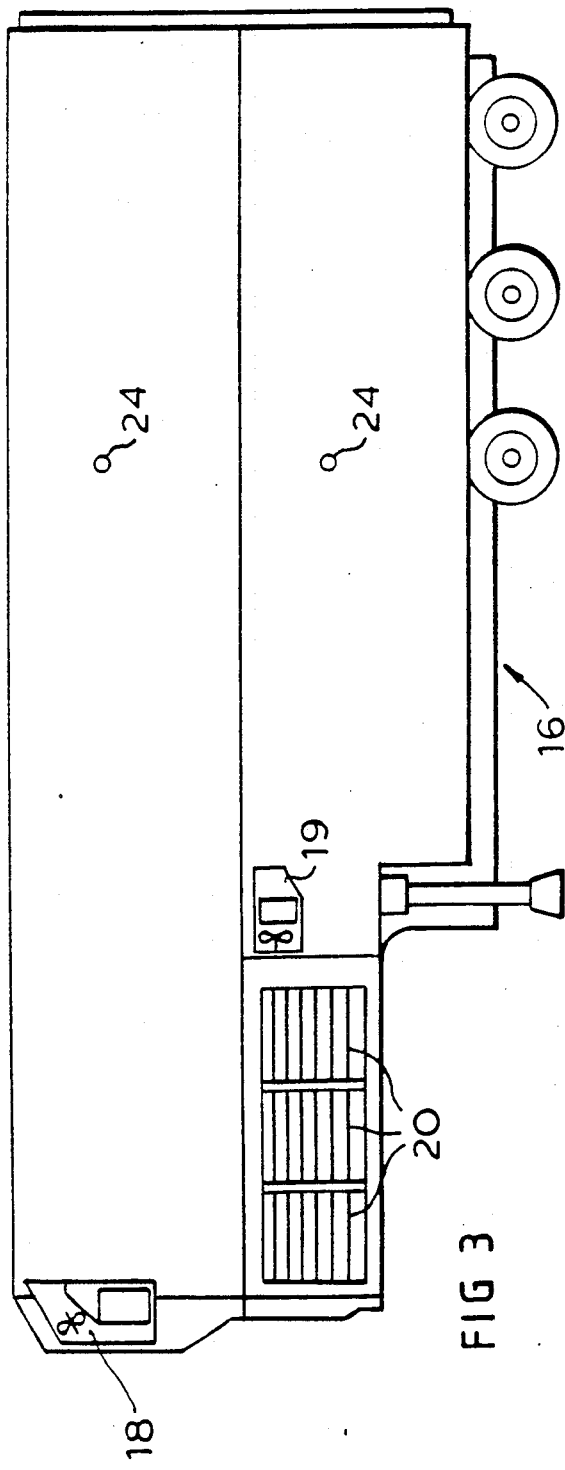

MULTICOMPARTMENT TEMPERATURE CONTROLLED ROAD VEHICLES

BACKGROUND OF THE INVENTION

1. Field of the Invention

This invention relates to temperature-controlled road vehicles, and more especially to multicompartmented temperature-controlled road vehicles.

2. Description of the Prior Art

It has been well known for many years to provide an essentially closed delivery vehicle with an on-board refrigeration circuit.

Initially, only a single storage chamber was present, and air was cooled over the evaporator coils of the refrigeration unit, pumped into the chamber, recycled for further passage over the cooling coils of the evaporator, and so on. The heat absorbed by these coils was dissipated by passing the refrigerant fluid through an external condenser before recycling and expansion.

Subsequently, the need arose to provide the vehicle with two compartment for holding goods at different temperatures, e.g. frozen and chilled, or chilled and "controlled ambient" temperatures. This could be accommodated by generally maintaining the circuit of cold air as before in the colder compartment, but occasionally, e.g. as required by a thermostat, diverting a supply of such air to the less cold compartment. Alternative systems, e.g. involving a permanent bleed of colder air, were also possible.

More recently, three-compartment vehicles have been utilized. Various expedients have been adopted to ensure supplies of cool air, as needed, without cross-flavoring the compartment contents. Moreover, in recognition of the problem that there may be a warming requirement (e.g. because external temperature is below the "controlled ambient" requirement, or because of loss of heat through internal bulkheads to a deep-frozen compartment, with the same consequence), elaborate systems of sensing, and valving, and ducting, and reversal of evaporator action by passage of hot refrigerant, and application of extraneous heat supplies such as electrical fan heaters, have been proposed. In practice, with vehicles sold as suitable for operation in very hot or very cold climates, with different loadings of goods needing different conditions and with varying frequency of loading of compartments, the various temperature sensors in these vehicles can sometimes send conflicting operating signals to the compressor and to the valving of the ducted air supply, so that a prioritizing logic circuit is required for practical operation to deal with the compartments for optimum results.

There is nowadays a requirement for highly compartmented vehicles, e.g. six-compartment vehicles, and rapid changeover of storage conditions within each compartment. The present invention is based upon the realization that existing technology, based on sensor-controlled selective valving of supply ducting and ability to supply hot or cold air, is too complex to use in these multicompartment vehicles because of the possible interactions of the pressure and temperature conditions in the various compartments during the transient phases of operation.

Six-compartment vehicles are nowadays typically designed with six separate and thermally insulated longitudinal lanes of storage, three at a lower level and three at a higher level. The need for such vehicles does not exclusively reside in the ability to convey goods at six different temperatures, but has its origins in traffic congestion conditions at supermarkets or the like. Nowadays, to economize on stock and on holding space at their retail outlets (with high land values) it is typical for supermarkets to require frequent and smaller deliveries. Thus, a number of large specialist trucks will accumulate for unloading causing congestion, and must each moreover service say up to ten deliveries a day. Multicompartment and multi-temperature trucks, however, can each carry a range of delivery items, and consequently lead to less congestion and fewer deliveries each per day.

Such trucks, with elongate lanes, typically have movable floors which convey goods sequentially to the open rearward ends of the lanes and have also a relatively elaborate goods-handling loading/unloading mechanism which can operate between the floors, lower lane level and upper lane level in any one of three lane positions. Because they are used to convey a multi-product load they are typically loaded to a pre-existing program given to the driver for operation (or even fed in to the equipment at the depot) thus minimizing delivery error, theft or pressures on the driver for a larger or smaller delivery. Their complexity makes them an expensive prime cost, even though a fleet of such vehicles can be more cheaply operated, so that they are most economic if manufactured to the limit of legal sizes and weights.

SUMMARY OF THE INVENTION

The above combination of characteristics, problems and opportunities has led to the present invention which consists in a multicompartmented road vehicle, the compartments of which are thermally insulated, having a generally separate electrically driven refrigeration circuit for each compartment, at least one temperature sensor in each compartment to govern switching on and off of the electrical supply, and a common generator for the electrical supply.

By "generally separate" is meant that the condenser unit of each refrigeration circuit can be totally separate from the others, or be made up as separate ducting portions of one mechanical condenser structure or can possibly be subsumed in a shared condenser system. Totally separate condensers, located in an accessible accumulation or bank, are however preferred.

The system as described above, with its high prime cost, multitude of working refrigerator units to maintain; and weight and bulk is completely counterindicated in prior art vehicular refrigeration techniques, but we have realized that for a multicompartment e.g. six-lane vehicle, (a) the high prime cost is an acceptable proportion of the cost of the whole vehicle; (b) the cost of maintenance is outweighed by the avoidance of complex ducting, shutter-valves, and prioritizing logic and safety circuits, and also by the attractively flexible working characteristics of such vehicles; and (c) weight and bulk are again commensurate with the large size and high weight of the vehicle. Moreover, the presence of an on-board diesel generator powerful enough to operate all six refrigeration systems gives the facility of providing power for hydraulic or pneumatic loading and unloading equipment, i.e., the moving lane floors and complex handling equipment as discussed above.

A particularly preferred feature of the invention is the provision of a mechanical, hydraulic or electronic sequencing means governing the switch-on of each refrigeration system for its electrically driven operation.

Once again, a man skilled in the art would not be led to drive six systems of such equipment from a common generator. The load characteristics of each system are such that, after switch-on, the load rises to a peak and then falls away to a maintenance level. Six coinciding peaks would burn out most feasible generator systems, but the interposition of a single sequencing means whereby the systems never come on together (or whereby not more than, say, two systems come on together) can avoid damage and facilitate use of a practically-sized generator. For instance, a sequence of six operating cams on a common rotary shaft can control the switching on of the refrigeration system load. It is also within the scope of the invention to route working signals received from compartment thermostats through the same system so that whatever instruction is given can only take its priority within the sequence, even if earlier instructions on other systems are merely confirmed by the sequencing means.

Other features of the invention include mounting of the diesel generator beneath the vehicle if desired, and the presence of a control cubicle, if desired, at the forward part of the vehicle, e.g. to switch from generator operation to mains electricity while loading, or to connect in ancillary equipment. The refrigeration systems will normally each be of the recirculated cold-air type so that all parts of the elongate lanes can be effectively reached.

BRIEF DESCRIPTION OF THE DRAWINGS

The invention will be further described with reference to the accompanying drawings, in which:

FIG. 2 shows diagrammatically from above a temperature-controlled six-lane trailer unit;

FIG. 3 shows diagrammatically from one side the unit of FIG. 2; and,

DETAILED DESCRIPTION OF THE PREFERRED EMBODIMENT

Figure 1:
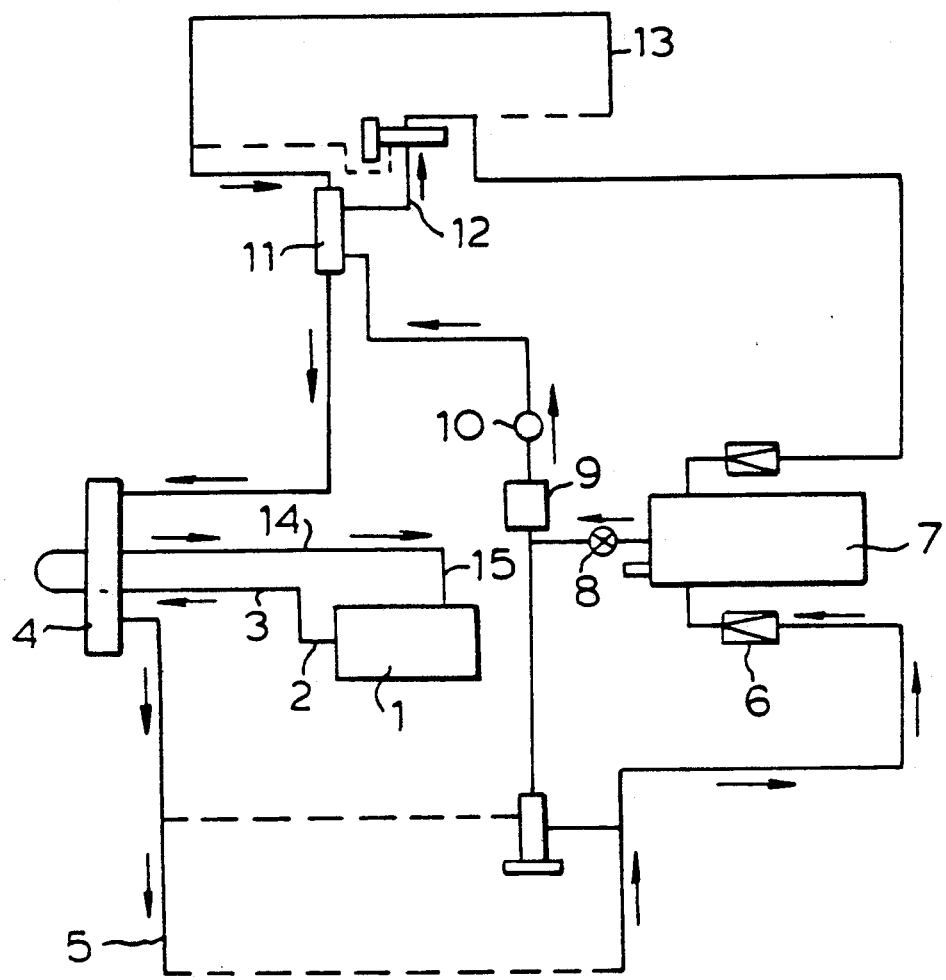
FIG. 1 shows a refrigeration circuit which can be used one for each compartment of a multicompartment vehicle.

FIG. 1 shows a compressor 1, a discharge valve location 2 and a vibration-absorbing run of ducting 3. Pumped gas passes via a valve 4 into the coils of a condenser 5, where a fan draws cold external air past the coils to condense the gas to liquid. This liquid passes through a check valve 6 to a receiver tank 7. It then passes still at high pressure past a valve 8 and dehydrator 9, where mixture and impurities are removed, into a sight glass 10 which remains clear when the refrigerant charge is sufficient. Liquid then passes in a heat exchange at 11, to cool against the cold refrigerant returning from an evaporator 13. Cool liquid enters the evaporator 13 via an expansion valve 12, and loses pressure and hence temperature to cool the coils of the evaporator 13, over which air feed to the compartment passes. The cooled refrigerant passes back (usually as a vapor/liquid mixture via the heat-exchanger 11) to warm slightly and liberate any refrigerant present in lubricating oil droplets. The refrigerant, by now in gas form, then passes again through the reverse cycle valve 4, a vibration-absorbing ducting 14 and, via a suction valve location 15, into the compressor 1.

FIGS. 2 and 3 show from the top and side respectively, a six-lane temperature controlled trailer 16 with lanes as at 17, three at the top and three at the bottom. Each top lane is provided with a separate evaporator/fan unit 18 for cold air, and each bottom lane with a similar evaporator/fan unit 19, in each case illustrated as reference character 13 in FIG. 1. Each such unit 18 or 19 has a separate circuit as shown in FIG. 1, with a separate condenser 20 (cf. condenser 5), the condensers being mutually arranged as a bank of condensers as and where shown.

The electrical drive for each system is provided by a diesel generator 21 within a cubicle 22 or beneath the floor of the vehicle. Preferably a sequencing means to prevent electrical overload, e.g., a logic controller system or a mechanically cammed sequence controlling switch-on, is present in the system.

The cubicle 22 further includes electrical control panels 23, and can include hydraulic or pneumatic units connected to the generator 21 to operate moving-floor or tailgate lift systems as and when desired, possibly only on switch-off of refrigeration.

Thermostats 24, one in each lane, are operatively connected to each electrical drive for each separate refrigeration system: preferably their action is, however, sequenced or prioritized in the event of excess or conflicting demand on the equipment.

Although FIGS. 2 and 3 show longitudinal lanes the system illustrated will operate in other numbers, combinations and shapes of compartment.

Figure 4:
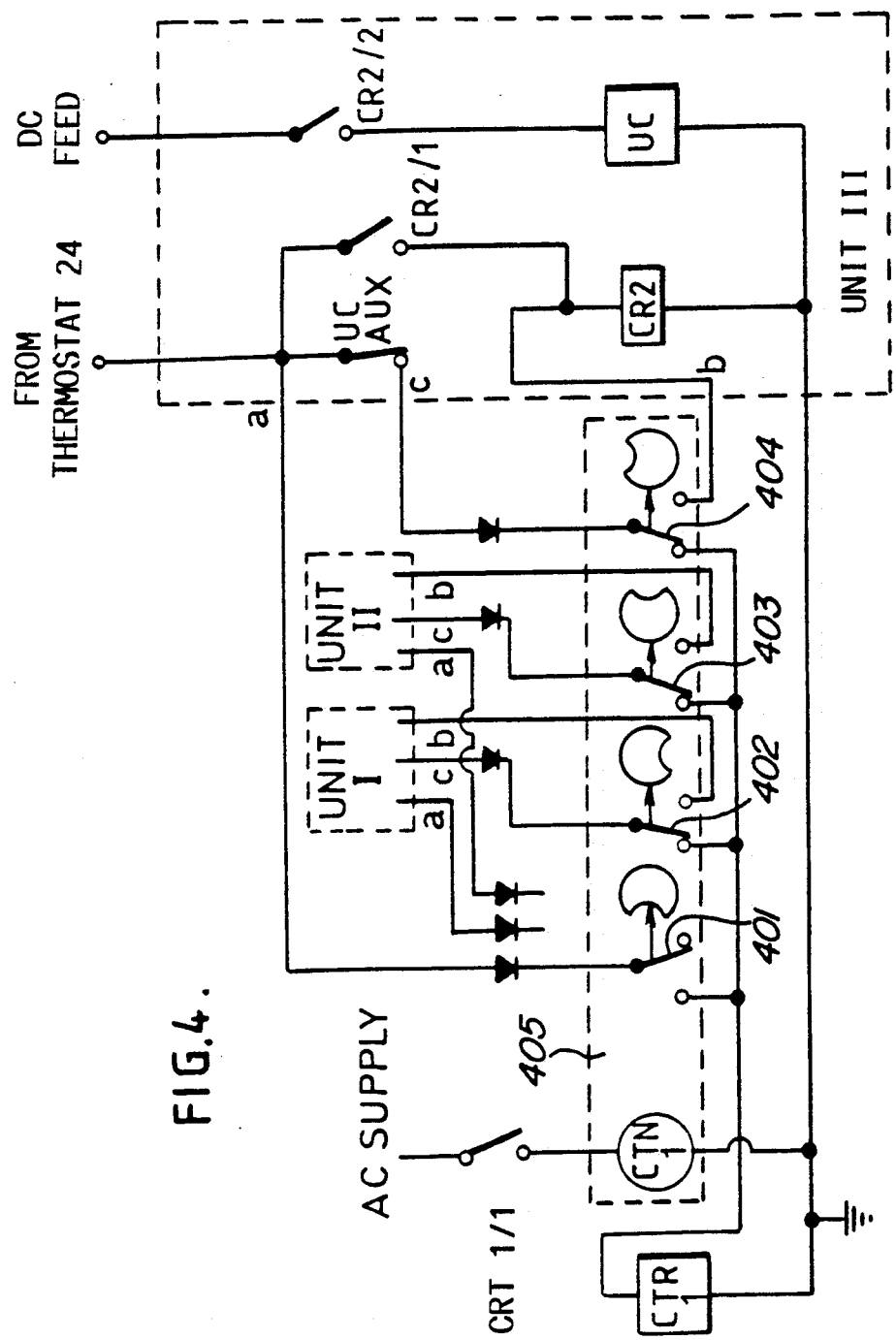
FIG. 4 shows diagrammatically equipment for providing sequential start-up for the separate refrigeration units.

FIG. 4 diagrammatically illustrates equipment for providing sequential start-up for the separate refrigeration units. For clarity of illustration, the diagram illustrates sequencing for three units only but one skilled in the art will appreciate that the same principles will apply to a six-unit installation as shown in FIGS. 2 and 3.

Sequential start-up is valuable (a) to avoid the initial overload of the combined starting torque of the motors in all units simultaneously, and (b) to avoid casual overload when several unit a motors switch on simultaneously during operation of the installation, by coincidental operation of two or more of the thermostats 24.

The equipment shown is essentially a cam timer, the mechanism of which includes four cam switches 401, 402, 403, 404 activated by four cams mounted at 90° intervals on a common shaft driven by a motor 405, and three refrigeration units, only one of which (UNIT III) is shown in its control and circuitry details, the other two being essentially identical. The cam switches 401–404 are in an open position when the cam followers indicated by 401a–404a are engaging the outer surface of the cams 401b–404c and are in a closed position when the cam followers 401a–404a are engaged in the arcuate recesses 401c–401c, respectively.

The equipment operates as follows:

A signal from the thermostat 24 feeds via the cam switch 404 to a cam timer control relay CTR1. This closes a contact CTR1/1, and the motor 405 starts to rotate its shaft and the cams associated with cam switches 401 through 404. The cam switch 401 closes and will stay closed for the whole revolution of the shaft of the motor 405. After for example 15 seconds (or whatever time is equivalent to one quarter turn) the cam switch 402 closes and finds either (a) the relevant thermostat not calling for cooling of the associated compartment, or (b) that unit I is already operative. The cam switch 402 subsequently opens with the continued rotation of its associated cam.

After 30 seconds, the same situation applies to cam switch 403 and unit II.

After 45 seconds, the cam switch 404 closes and opens again. As it closes, a relay CR2 is energized.

As a result of energizing relay CR2, a CR2/1 locks the relay CR2 on.

A contact CR2/2 also closes as the result of relay CR2 being energized and energizes the main unit contactor UC, thereby starting the refrigeration system of unit III. The auxiliary unit contactor CR2/3 is held open to ensure that no feed from the thermostat 24 is given to the cam switches 401 through 404 while relay CR2 is energized and the unit III is running.

After, the shaft of the motor 405 has returned to its starting position, cam switch 401 opens and deactivates the motor 405.

Unit III will continue to operate until its thermostat 24 is satisfied, at which point the thermostat contacts open to de-energize CR2 and UC, and thus also restore UC AUX to its original position.

One skilled in the art will appreciate that if say 20 seconds after unit III thermostat calls for cooling unit II thermostat also opens and interposes a signal, the rotation of the cam will actuate equivalent circuitry for unit II and, fifteen seconds later, for unit III as above. Thus, rotation of the cam leads each switch in turn to a confirmatory, non-operative or operative situation, but the sequencing is always present however simultaneous the calls on the generator.

If desired, the sequencing can also be effected electronically.

We claim:

1. A multicompartmented road vehicle comprising:
   at least three load compartments thermally insulated from each other;
   at least three temperature sensors, one temperature sensor of said at least three temperature sensors being disposed in each of said at least three load compartments; each temperature sensor generating an output signal in response to the temperature in said load compartment in which it is disposed exceeding a preselected temperature;
   at least three separately driven refrigeration circuits, one refrigeration circuit of said at least three refrigeration circuits associated with a respective one of said at least three load compartments and the temperature sensor disposed therein, each of said refrigeration circuits providing cold air to its associated load compartment in response to its temperature sensor generating an output signal;
   start sequencing means connected between said at least three temperature sensors and said at least three refrigeration circuits for connecting one at a time, each of said three temperature sensors to its associated refrigeration circuit in a predetermined sequence in response to at least one of said at least three temperature sensors generating said output signal, said predetermined sequence selected to allow only one of said refrigeration circuits to be started at any given time independent of more than one of said at least three temperature sensors generating said output signal at the same time;
   a common electrical generator for supplying electrical power to each of said at least three refrigeration circuits; and
   wherein each refrigeration circuit of said at least three refrigeration circuits includes means for disconnecting its associated temperature sensor from said start sequencing means and connecting its associated temperature sensor directly to itself in response to receiving said output signal from its associated temperature sensor from said start sequencing means.

2. A multicompartmented road vehicle as claimed in claim 1 wherein each of said at least three refrigeration circuits has its own condenser unit and wherein said condenser units are located adjacent each other as an accessible accumulation of such condenser units.

3. A multicompartmented road vehicle as claimed in claim 1 in which said start sequencing means comprises at least three operating cams on a rotary shaft, each operating cam of said at least three operating cams activating an electrical switch connected between one of said at least three temperature sensors and its associated refrigeration circuit.

4. A multicompartmented road vehicle as claimed in claim 1 in which said common generator is located beneath said vehicle.

5. A multicompartmented road vehicle as claimed in claim 1 further comprising an operator control cubicle in the forward part of said vehicle.

6. In a multicompartmented road vehicle comprising a plurality of thermally insulated refrigerated compartments capable of holding goods at different temperatures, each refrigerated compartment having its own electrically driven refrigeration unit and an associated temperature sensor which generates an output signal when the temperature in its refrigerated compartment exceeds a preselected temperature, said output signal activating its associated refrigeration unit to supply cold air to its associated refrigerated compartment, and a common power supply providing electrical power to each of said refrigeration units, the improvement comprising start sequencing means connected between each temperature sensor and its associated refrigeration unit for connecting, one at a time, each of said temperature sensors to its associated refrigeration unit in a predetermined sequence in response to at least one of said temperature sensors generating said output signal, said predetermined sequence selected to allow only one of said refrigeration units to be started at any given time independent of more than one of said temperature sensors generating said output signal at the same time and wherein each refrigeration unit has means for disconnecting its associated temperature sensor from said start sequencing means and connecting its associated temperature sensor directly to itself in response to receiving said output signal generated by its associated temperature sensor from said start sequencing means.

* * * * *

UNITED STATES PATENT AND TRADEMARK OFFICE
CERTIFICATE OF CORRECTION

PATENT NO. : 5,012,653
DATED : May 7, 1991
INVENTOR(S) : Ryde et al

It is certified that error appears in the above-identified patent and that said Letters Patent is hereby corrected as shown below:

Column 1, line 22, delete "compartment" and insert ---- compartments ----.

Column 2, line 51, after "multicompartment" insert a comma ---- , ----.

Column 3, line 40, delete the comma ",".

Column 4, line 42, delete "a".

Column 4, line 56, delete "401C" and insert ---- 404c ----.

Column 5, line 7, after "a" (second occurrence) insert ---- contact ----.

Signed and Sealed this

Eighth Day of September, 1992

Attest:

DOUGLAS B. COMER

*Attesting Officer*  *Acting Commissioner of Patents and Trademarks*